(12) United States Patent
Tornatore

(10) Patent No.: US 6,234,933 B1
(45) Date of Patent: *May 22, 2001

(54) METHOD AND DEVICE FOR CONTROLLING A TRANSMISSION GROUP OF A VEHICLE

(75) Inventor: Giovanni Tornatore, S. Benigno Canavese (IT)

(73) Assignee: Magneti Marelli S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,830

(22) Filed: Jun. 24, 1998

(30) Foreign Application Priority Data

Jun. 25, 1997 (IT) .............................. TO97A0556

(51) Int. Cl.$^7$ .................................... F16H 61/28
(52) U.S. Cl. ................ 477/78; 477/110; 74/335
(58) Field of Search ............. 477/107–118, 78; 701/53, 56, 61; 74/335

(56) References Cited

U.S. PATENT DOCUMENTS

| | | | |
|---|---|---|---|
| 4,766,774 | | 8/1988 | Tamai ........................ 74/475 |
| 5,162,997 | * | 11/1992 | Takahashi .................... 477/107 |
| 5,611,753 | * | 3/1997 | Kondo et al. ................ 477/118 |
| 5,618,243 | * | 4/1997 | Kondo et al. ................ 477/118 X |
| 5,655,995 | * | 8/1997 | Kondo et al. ................ 477/901 X |
| 5,832,400 | * | 11/1998 | Takahashi et al. .............. 701/53 |

FOREIGN PATENT DOCUMENTS

| | | |
|---|---|---|
| 0 378 218 A1 | 7/1990 | (EP) . |
| 0 422 444 A2 | 4/1991 | (EP) . |
| 0 477 564 A2 | 4/1992 | (EP) . |
| 0 777 071 A1 | 6/1997 | (EP) . |
| 60-146953 | 12/1985 | (JP) . |

OTHER PUBLICATIONS

European Patent Office International Search Report Corresponding to ApplicationSer. No. 98111633.8–2306–.

* cited by examiner

Primary Examiner—Khoi Q. Ta
(74) Attorney, Agent, or Firm—Baker & Daniels

(57) ABSTRACT

For a transmission group comprising a gearbox and an actuating group coupled to the gearbox for commanding engagement/disengagement of the gears, the method comprises the steps of generating at least one command signal for the actuating group having, during a first operating step of a gear change manoeuvre, a width the time pattern of which comprises at least one first section wherein the width of the command signal increases in substantially linear fashion according to an increase coefficient from an initial value to an intermediate value; and of calculating the increase coefficient and the initial and intermediate values in relation to at least one first operative reference value representing the shift of gear to be effected during the gear change manoeuvre and a correction value representing the style of driving the vehicle.

38 Claims, 8 Drawing Sheets

FIG_6

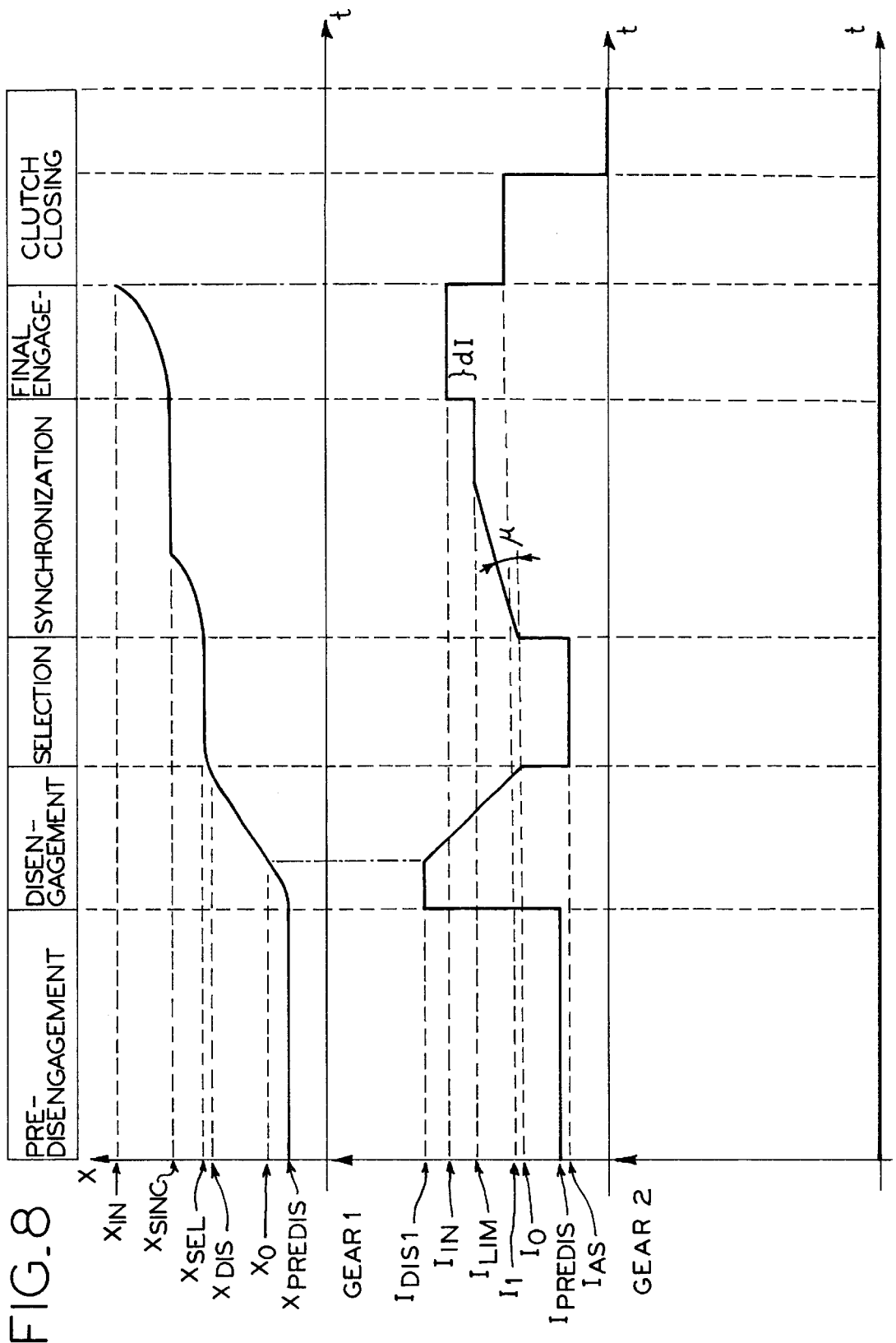

METHOD AND DEVICE FOR CONTROLLING A TRANSMISSION GROUP OF A VEHICLE

BACKGROUND OF THE INVENTION

This invention relates to a method and a device for controlling a transmission group of a vehicle.

As is known, a transmission group of a vehicle comprises a gearbox, a clutch intended for releasably coupling the gearbox with the vehicle engine, a first actuating group coupled with the clutch so as to command opening and closing type actuation of the clutch and a second and a third actuating group coupled with the gearbox for commanding respectively selection and engagement/disengagement of the gears.

The transmission group also co-operates with a control device outputting command signals to the actuating groups for the activation of the clutch and the selection and engagement/disengagement of the gears.

At the moment, the known control devices generate command signals for the actuating group accomplishing engagement/disengagement of the gears having width time patterns determined in the design stage of the control devices in relation to the type of gearbox assembled on board the vehicle.

These time patterns are in some cases unsuitable for optimum management of the various operating and running conditions of the vehicle as they are determined without taking into account factors having a considerable impact on the performance, comfort and running safety of the vehicle such as, for example, the driving style (normal or sporty) of the driver, or the gear shift to be effected.

The known control devices are, moreover, incapable of intervening in good time under gearbox operating conditions that may prove to be particularly dangerous such as, for example, failures or jamming that do not permit engagement of the required gear.

SUMMARY OF THE INVENTION

The scope of this invention is therefore that of producing a control device and method that permit more effective management of the transmission group in order to improve the performance, comfort and running safety of the vehicle.

Preferably the control device and method according to this invention must also be capable of intervening appropriately in cases of failure or jamming of the gearbox.

According to this invention, a method is produced for controlling the transmission group of a vehicle, said transmission group comprising a gearbox and actuating means coupled with the gearbox for commanding engagement/disengagement of the gears;

said method comprising the step of generating at least one command signal for said actuating means during a gear change manoeuvre; said command signal having a width of time pattern defined by a plurality of characteristic values;

said method being characterized in that it comprises the step of:

a) calculating at least a first of said characteristic values in relation to at least one operative reference value representing a respective gear shift to be effected during said gear change manoeuvre and an operative correction value representing a respective style of driving the vehicle.

According to this invention, a device is also produced for controlling a transmission group of a vehicle, said transmission group comprising a gearbox and actuating means coupled with the gearbox for commanding engagement/disengagement of the gears;

said control device comprising signal generating means generating at least one command signal for said actuating means during a gear change manoeuvre; said command signal having a width the time pattern of which is defined by a plurality of characteristic values;

said control device being characterized in that said signal generating means comprise calculating means suitable for calculating at least a first of said characteristic values in relation to at least one operative reference value representing a respective gear shift to be effected during said gear change manoeuvre and an operative correction value representing a respective style of driving the vehicle.

BRIEF DESCRIPTION OF THE DRAWINGS

A clearer understanding of the present invention will be gained from the following description of a preferred embodiment, provided purely by way of an illustrative, non-restrictive example, with reference to the accompanying figures, where:

FIG. 8 illustrates patterns of some quantities relative to a second embodiment of the control device of FIG. 1.

DETAILED DESCRIPTION OF THE INVENTION

Figure 1:
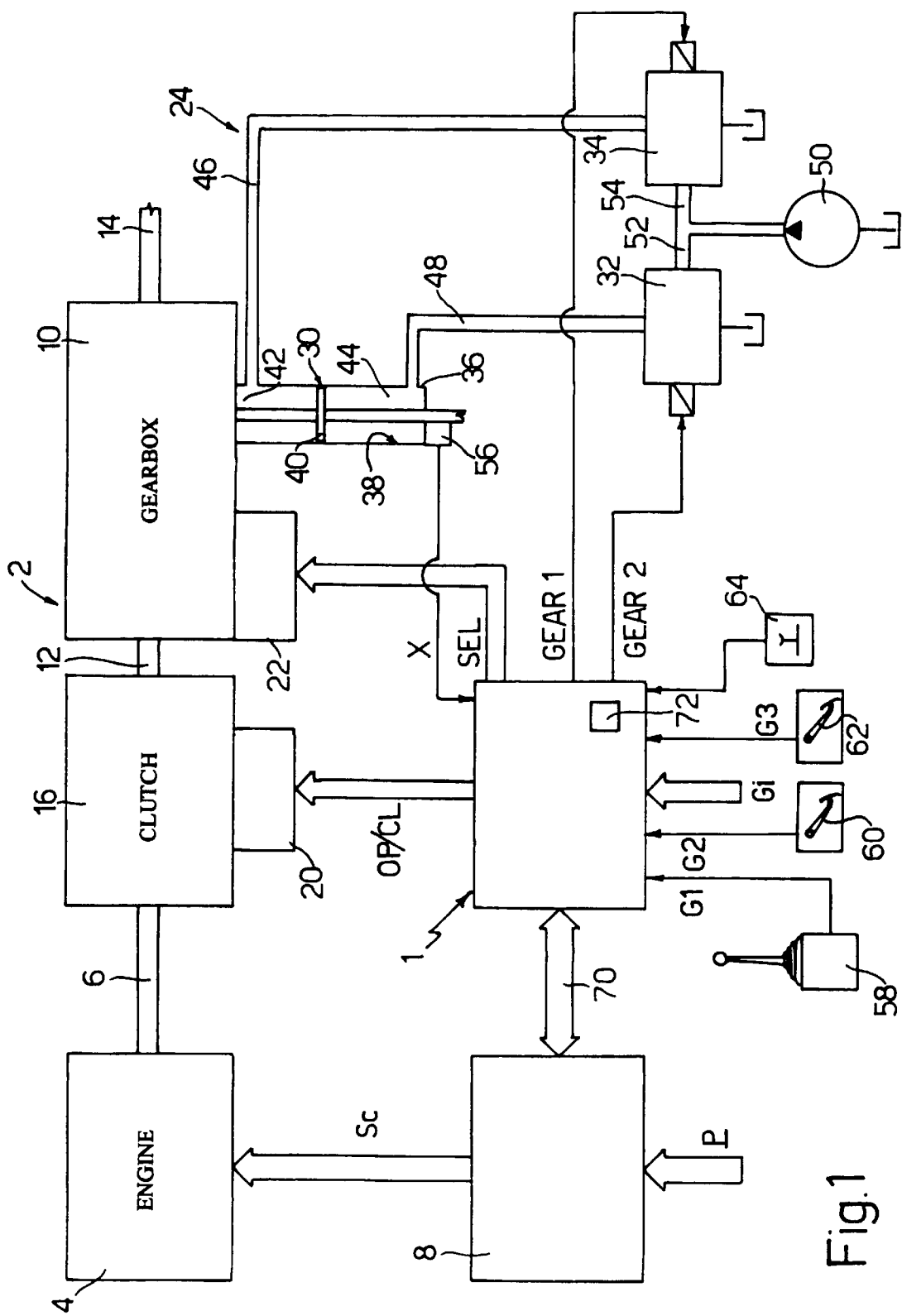
FIG. 1 is a block diagram of a transmission group connected to an engine and commanded by a control device built according to this invention.

Indicated generally with the reference numeral 1 in FIG. 1 is a control device of a transmission group 2 placed between an engine 4 and the wheels (not shown) of a vehicle (not shown).

More specifically, the engine 4 has an output shaft 6 connected in a known way to the transmission group 2 for providing mechanical power thereto and co-operates with an electronic control unit 8 for engine control receiving as its input a plurality of information parameters P measured mainly on the engine 4 itself and generating as its output command signals $S_C$ for an ignition system and an injection system (not shown) of the engine 4.

The transmission group 2 comprises a gearbox 10 having an input shaft and an output shaft 12, 14 connected in a known way to the engine 4 and, respectively, to the wheels of the vehicle and having the purpose of transmitting mechanical power to the wheels. The transmission group 2 also comprises a clutch 16 placed between the output shaft 6 of the engine 4 and the input shaft 12 of the gearbox 10 and having the purpose of releasably coupling the gearbox 10 with the engine 4.

The transmission group 2 also comprises a first actuating group 20 coupled with the clutch 16 and having the purpose of commanding the opening and closing type activation of the clutch 16, a second actuating group 22 coupled with the gearbox 10 and having the purpose of commanding the selection of the gears, and a third actuating group 24 coupled with the gearbox 10 and having the purpose of commanding the engagement/disengagement of the gears.

The first and the second actuating group 20, 22, both of known type, are schematically represented in FIG. 1 and will not be described in detail while the third actuating group 24, also of known type, is illustrated in greater detail in FIG. 1 and will be described below as it helps clarify understanding of this invention.

More specifically, the third actuating group 24, accomplishing engagement and disengagement of the gears of the gearbox 10, comprises a double-effect hydraulic actuator 30 with three defined mechanical positions and a first and a second pressure-regulating electrovalve 32, 34 coupled with the actuator 30.

In detail, the actuator 30 comprises an external casing 36 internally defining a cavity 38 and a movable member 40 slidingly accommodated inside the cavity 38 and delimiting, together with the walls of the cavity 38, a first and second chamber 42, 44 kept separate and sealed from each other by the movable member 40 itself. Each chamber 42, 44 is connected through a respective duct 46, 48 to respectively one of the pressure-regulating electrovalves 32, 34, which are in turn connected to an electropump 50 from which they receive oil under pressure through respective ducts 52, 54.

Operation of the double-effect actuator 30 with three defined mechanical positions is known and will not therefore be described in detail, though it is recalled that the movable member 40 in this kind of actuator is suitable for assuming a central idle position when oil under pressure is fed into both the chambers 42, 44 and a first and second end-of-stroke position arranged at opposite ends of the central idle position when oil under pressure is fed into the first or second respectively of the chambers 42, 44.

The third actuating group also comprises a position sensor 56 coupled with the movable member 40 of the actuator 30 and generates as output a position signal X in relation to the position of the movable member 40.

The control device 1 of the transmission group 2 receives as input a plurality of operative signals G and the position signal X and generates as output command signals for the actuating groups 20, 22, 24 for the activation of the clutch 16 and the selection and the engagement/disengagement of the gears.

In particular, the control device 1 receives as input a first operative signal G1 generated by a manually actuatable gear selector device 58 and indicative of the gear shift requested by the driver of the vehicle, a second operative signal G2 generated by an accelerator pedal 60 and indicative of the position of the accelerator pedal 60 itself, a third operative signal G3 generated by a brake pedal 62 and indicative of the pressure exerted by the driver on the brake pedal 62 itself, a fourth operative signal G4 generated by a selection pushbutton 66 and indicative of the performance level of the vehicle (normal or sporty) selected by the driver by way of the selection push-button 66 itself, and operative signals Gi representing the operating conditions of the engine 4, such as the angular velocity of the engine 4, of the gearbox 10 and of the clutch 16, the couple generated by the engine 4, the temperature of the oil in the gearbox 10, etc.

The control device 1 is also connected to the engine control unit 8 by means of a bi-directional data transmission line (BUS) 70.

In particular, the control device 1 generates (in a known way) as output, in relation to the operative signals G and the position signal X, clutch command signals OP/CL fed to the first actuating group 20 for the opening and closing of the clutch 16, selection command signals SEL fed to the second actuating group 22 for the selection of the gears, and engagement/disengagement command signals GEAR fed to the third actuating group 24 for the engagement and disengagement of the gears.

More specifically, the engagement/disengagement command signals GEAR are current command signals and comprise a first command signal GEAR1 fed to the first electrovalve 32 of the third actuating group 24, and a second command signal GEAR2 fed to the second electrovalve 34 of the third actuating group 24, which output oil, the pressure of which is proportional to the width of the respective command signal fed thereto.

According to a preferred embodiment, the control device 1 comprises a memory 72 wherein are stored the time patterns of the OP/CL, SEL and GEAR command signals in relation to the operative signals G and to the position signal X, and a plurality of further data used for the control of the transmission group 1, as described in greater detail below.

Operation of the control device 1 will now be described with reference to a generic gear change manoeuvre, which generally consists of an initial gear change request step, effected for instance through the selection device 58, a step of pre-disengagement of the engaged gear in which opening of the clutch 16 is also simultaneously commanded, a step of disengagement true and proper of the engaged gear, if and as applicable a step of selection of a different gear range made when the gear it is desired to engage belongs to a different range from that to which the currently engaged gear belongs, a gearbox 10 synchronization step, if and as applicable a step of final engagement of the requested gear in cases where engagement of the desired gear was not directly obtained in the synchronization step, and a terminal step of closing of the clutch 16.

Operation of the control device 1 will also be described below with reference to the FIGS. 2–5 and 6–7 relating to a flow chart of the operations implemented by the control device 1 during the change of gear and respectively to drawings of the time pattern of the command signals GEAR1 and GEAR2 generated by the control device 1 itself during the change of gear and of the position signal X generated by the position sensor 56 coupled with the actuator 30.

Figure 6:
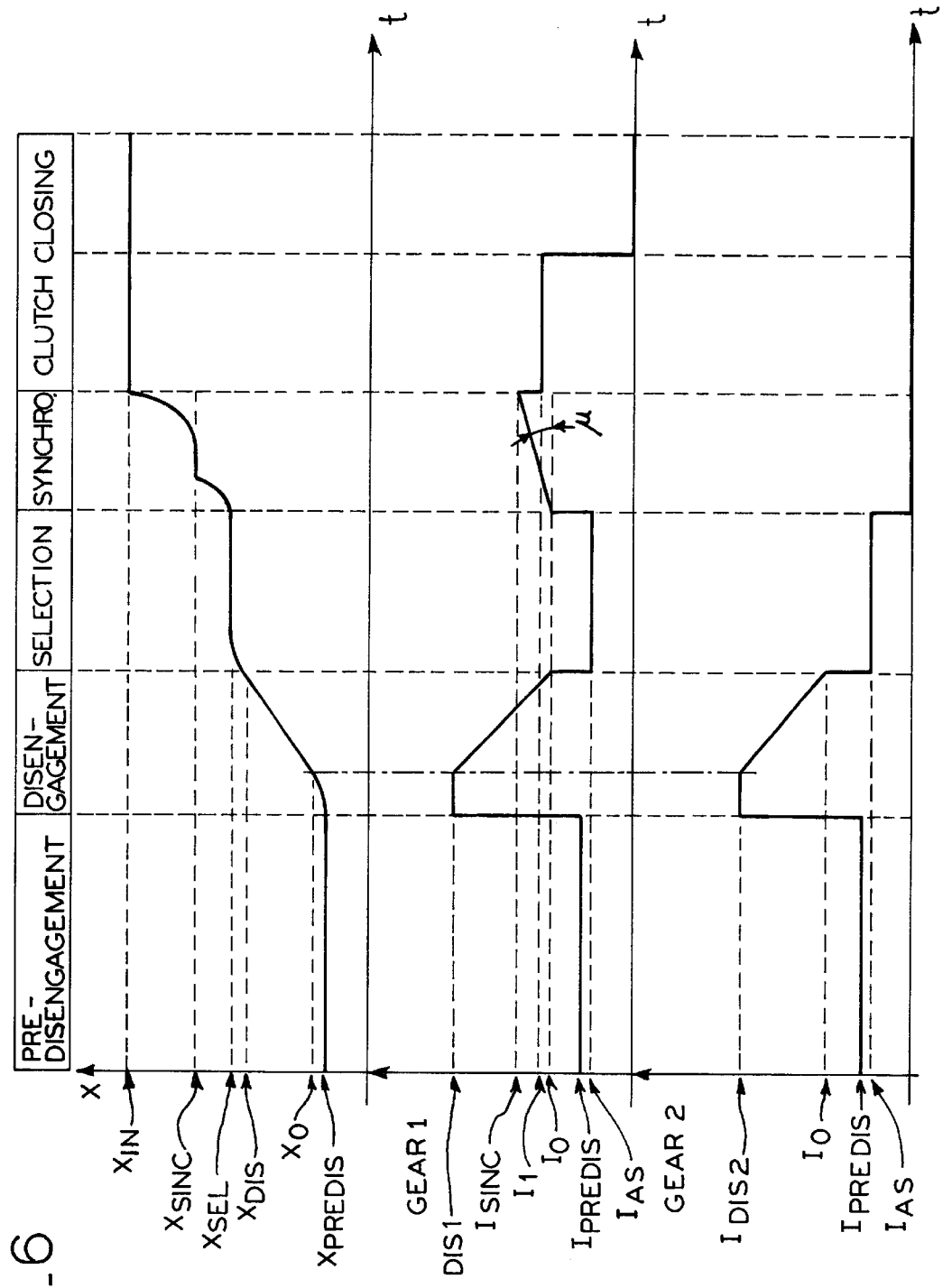
FIGS. 6 and 7 illustrate patterns of some quantities relative to a first embodiment of the control device of FIG. 1.

In particular, the plan of the drawing of FIG. 6, whereupon patterns of the above command signals GEAR1, GEAR2 and of the position signal X have been marked, is divided into a plurality of vertical reference windows each of which is associated with a corresponding operative step temporally characterizing the gear change; more specifically, each reference window is delimited by a pair of vertical chain lines temporally defining the respective operative step of the gear change and is identified by a respective indication of the name of the step, i.e. "PRE-DISENGAGEMENT", "DISENGAGEMENT", "SELECTION", "SYNCHRONIZATION", "FINAL ENGAGEMENT" and "CLUTCH CLOSING".

Accordingly, the sections of the time patterns of the command signals GEAR1, GEAR2 and of the position signal X within each reference window represent the values assumed by the widths of these signals in the particular operative step of the gear change that the reference window in question is associated with.

Figure 7:
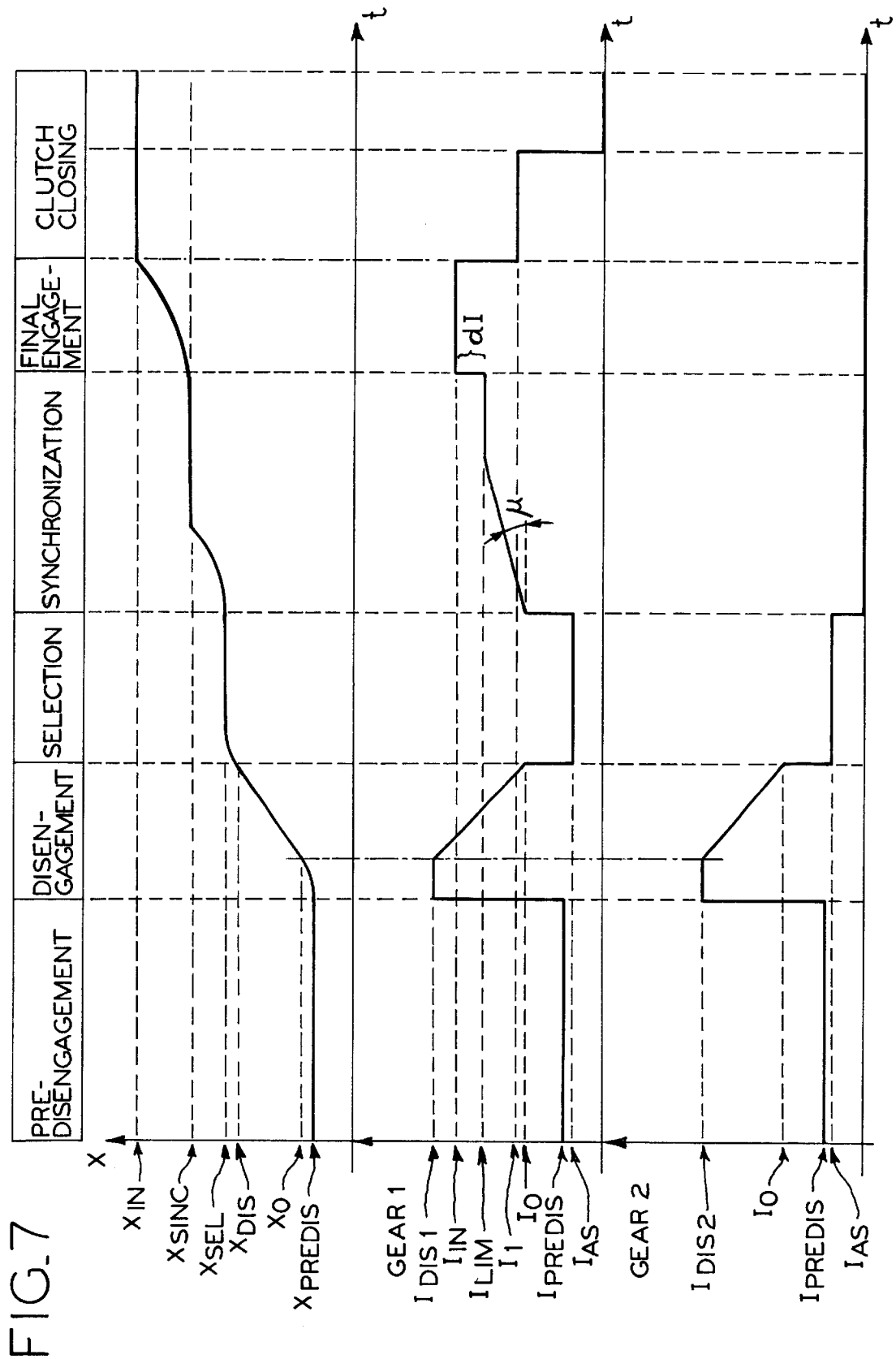

Moreover, shown in FIG. 6 are the time patterns of the above command signals GEAR1 and GEAR2 and of the position signal X for a gear change manoeuvre in which the engagement of the desired gear is obtained directly in the synchronization step, so that there is no final engagement step, whereas FIG. 7 depicts the time patterns of the above-mentioned signals for a gear change manoeuvre in which the engagement of the desired gear is not obtained in the synchronization step, so that the final engagement step is required.

It must also be pointed out that the execution of each of the operative steps of the gear change is temporally identifiable by reading of the logic state of a logic indicator, or flag, associated with it, the logic state (0 or 1) of which indicates whether the operative step has or has not been executed at that time. The logic states of the flags associated with the above-mentioned operative steps are stored in the memory 62 of the control device 1 and are updated or modified by a supervisor (not shown) during the gear change manoeuvre, which therefore commands the beginning and end of each operative step and also manages all the actuators of the gearbox 10.

Figure 2:
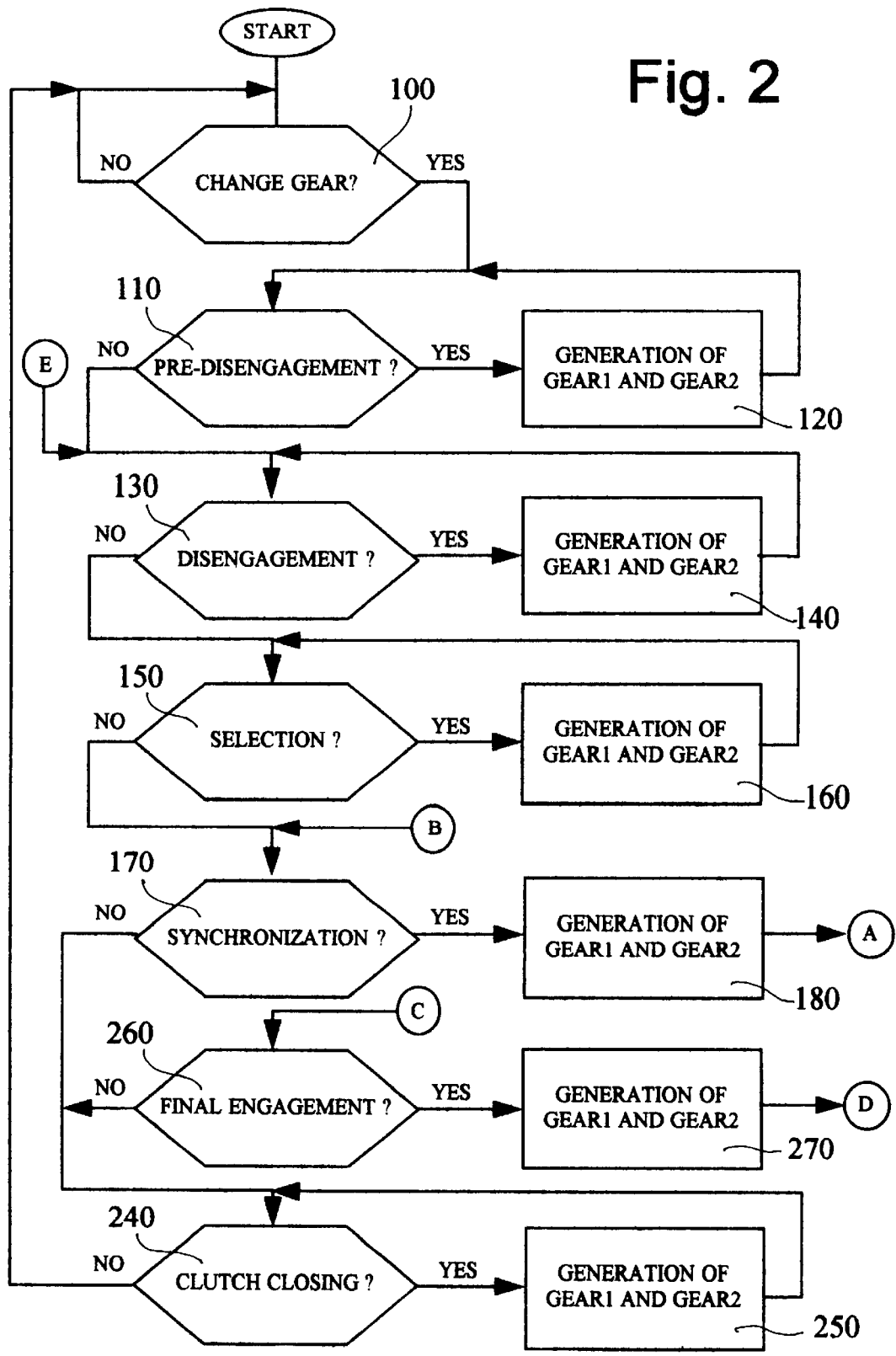
FIGS. 2, 3, 4 and 5 are flow charts of operations relative to the method according to this invention.

Illustrated in FIG. 2 is a flow chart of the operations implemented by the control device 1 during the above-mentioned change of gear. In particular, in the description that follows, it is assumed that the starting conditions are that the command signals GEAR1 and GEAR2 have null value widths and that the movable member 40 of the actuator 30 accomplishing engagement and disengagement of the gears is arranged in a first end-of-stroke position reached during the previous gear engagement step.

In accordance with FIG. 2, initially a block 100 is reached in which verification takes place of whether a gear change has been requested (that is to say, if the flag associated with that step assumes a first logic value, for instance 0).

If the gear change has not been requested (NO exit of the block 100), then a return is made to the block 100; otherwise, if the gear change has been requested (YES exit of the block 100), a block 110 is reached in which verification takes place of whether the flag associated with the pre-disengagement step assumes a first, determined logic value (for instance 0).

If the flag associated with the pre-disengagement step assumes the first logic value (YES exit of the block 110), then a block 120 is reached, whereas if the flag associated with the pre-disengagement step does not assume the first logic value (NO exit of the block 110), then a block 130 described below is reached.

In the block 120, command signals GEAR1 and GEAR2 of suitable widths are generated for the electrovalves 32, 34, so that the electrovalves 32, 34 themselves are disposed in a pre-operative condition described in greater detail below.

More specifically, the command signals GEAR1 and GEAR2 are generated in the block 120 for as long as the flag associated with the pre-disengagement step assumes the first logic value and therefore, at predetermined times during generation of the command signals GEAR1 and GEAR2, a return is made from the block 120 to the block 110 in which verification takes place cyclically if the flag associated with the pre-disengagement step assumes a first determined logic value (for instance 0).

The command signals GEAR1 and GEAR2 generated by the control device 1 for the electrovalves 32, 34 in the step of pre-disengagement of the engaged gear have substantially similar time patterns and, more exactly, have widths that are substantially constant in time for the duration of the pre-disengagement step with values, indicated with $I_{PREDIS}$ in FIGS. 6 and 7, that are substantially identical.

The values $I_{PREDIS}$ of the widths of the command signals GEAR1 and GEAR2 are such as to dispose the electrovalves 32, 34 in a pre-operative condition that guarantees their immediate operativity in the subsequent step of disengagement true and proper.

As a matter of fact, a characteristic shared by the electrovalves of the type described above is that they output oil having a pressure proportional to the width of the (current) command signal they receive as input in the event of this command signal being in excess of a predetermined threshold value typical of each electrovalve.

Accordingly, in the gear pre-disengagement step, the control device 1 generates, for as long as the flag associated with this step assumes the first logic value, command signals GEAR1 and GEAR2 for the electrovalve 32 and the electrovalve 34 respectively, with widths that are close to the characteristic threshold values of the electrovalves 32, 34, so as to dispose them in a pre-operative condition such that, on the slightest increase of the width of the command signals GEAR1 and GEAR2, there is a corresponding immediate presence of oil on their outlet with a pressure proportional to the width of the command signals GEAR1 and GEAR2 themselves.

In the pre-disengagement step, therefore, the position signal X has, as shown in FIGS. 6 and 7, a substantially constant pattern in time for all of the duration of the step in question and its width assumes a value indicated in the figures with $X_{PREDIS}$.

Moreover, in the gear pre-disengagement step, the control device 1 generates, in a known way not therefore described in detail, clutch command signals OP/CL fed to the first actuating group 20 for commanding the opening of the clutch 16.

When the flag associated with the pre-disengagement step changes logic value (following a modification made by the supervisor, from the first logic value to a second logic value, 1 in the present example), a jump is made from the block 110 to the block 130, in which verification takes place of whether the flag associated with the step of disengagement true and proper assumes a first logic value (for instance 0).

If the flag associated with the step of disengagement true and proper assumes the first logic value (YES exit of the block 130), then a block 140 is reached, whereas if the flag associated with the step of disengagement true and proper does not assume a first logic value (NO exit of the block 130), a block 150 described below is reached.

In the block 140, suitable command signals GEAR1 and GEAR2 are generated for the electrovalves 32, 34 so as to bring the movable member 40 of the actuator 30 from the first end-of-stroke position reached in the previous gear engagement step to the central idle position corresponding to the disengagement of the gear and hence to the gearbox 10 neutral condition.

In the same way as described for the pre-disengagement step, for the step of disengagement true and proper as well, the command signals GEAR1 and GEAR2 are generated in the block 140 for as long as the flag associated with this step assumes the first logic value and therefore, at predetermined times during generation of the command signals GEAR1 and GEAR2, a return is made from the block 140 to the block 130.

The command signals GEAR1 and GEAR2 generated by the control device 1 for the electrovalves 32, 34 in the step of disengagement true and proper have similar time patterns comprising, as shown in the FIGS. 6 and 7, a first section (current step) in which there is a rapid increase in the widths of the command signals GEAR1 and GEAR2 from the $I_{PREDIS}$ value assumed in the preceding pre-disengagement step to respective values indicated in the FIGS. 6 and 7 with $I_{DIS1}$ and $I_{DIS2}$, a second section in which the widths of the command signals GEAR1 and GEAR2 remain substantially constant at the respective previous values $I_{DIS1}$ and $I_{DIS2}$, and a third section in which the widths of the command signals GEAR1 and GEAR2 decrease in substantially linear fashion from the respective previous values $I_{DIS1}$ and $I_{DIS2}$ to a like value $I_O$ slightly greater than the value $I_{PREDIS}$ assumed by the command signals GEAR1 and GEAR2 in the preceding pre-disengagement step.

The values $I_O$, $I_{DIS1}$ and $I_{DIS2}$ are characteristic values defining the time pattern of the command signals GEAR1 and GEAR2 in the disengagement step and, according to this invention, are calculated in relation to operative values representing the gear shift to be effected during the gear change manoeuvre and to a correction value representing a respective style of driving the vehicle, described in greater detail below.

The values $I_{DIS1}$ and $I_{DIS2}$ are related, that is to say $I_{DIS2} = K.I_{DIS1}$ and, for example, they may even be equal.

The rapid increase of the widths of the command signals GEAR1 and GEAR from the value $I_{PREDIS}$ to the values $I_{DIS1}$ and $I_{DIS2}$, and their subsequent maintenance at these values permit, as already stated, the displacement to be commanded of the movable member 40 of the actuator 30 from the end-of-stroke position it reached during the engagement of the previous gear to the central idle position in which the gear is disengaged and the gearbox is thus in neutral, while the value $I_O$ assumed by the command signals GEAR1 and GEAR2 permits this central position to be maintained.

During the step of disengagement true and proper, the position signal X thus has, as shown in the FIGS. 6 and 7, a width increasing in time from the value $X_{PREDIS}$ assumed in the preceding pre-disengagement step to a value indicated in the figures with $X_{DIS}$, corresponding to which is the beginning of the neutral band of the gearbox 10.

The second section of the pattern of the command signals GEAR1 and GEAR2, in which their widths are maintained constant at the respective values $I_{DIS1}$ and $I_{DIS2}$, has a duration in time that is related to the value of the width of the position signal X.

In fact, the section during which the widths of the command signals GEAR1 and GEAR2 are maintained constant at their respective values $I_{DIS1}$ and $I_{DIS2}$ is terminated at the point when the position signal X, and hence the position of the movable member 40, exceeds a predetermined threshold value, indicated with $X_O$ in the FIGS. 6 and 7, corresponding to the disengagement true and proper of the gear previously engaged.

Further, the decreasing pattern of the command signals GEAR1 and GEAR2 from the values $I_{DIS1}$ and $I_{DIS2}$ to the value $I_O$ depends on the value of the position signal X (i.e., it depends on the position of the movable member 40 of the actuator 30) and, more particularly, this decreasing pattern depends on the difference between the instantaneous value of the position signal X and the quoted value $X_{DIS}$.

When the flag associated with the step of disengagement true and proper changes logic value (following a modification made by the supervisor, from the first logic value to a second logic value, 1 in the present example), a jump is made from the block 130 to the block 150, in which verification takes place of whether the flag associated with the step of selection of a gear range assumes a first logic value (for instance 0).

If the flag associated with the step of selection of a gear range assumes the first logic value (YES exit of the block 150), then a block 160 is reached, whereas if the flag associated with the step of selection of a gear range does not assume the first logic value (NO exit of the block 150), a block 170 described below is reached.

In the block 160, generated in a known way and not therefore described in detail, are suitable selection command signals SEL for the actuating group 22 accomplishing selection of a gear range and suitable command signals GEAR1 and GEAR2 for the electrovalves 32, 34 of the actuating group 24 accomplishing engagement and disengagement of the gears.

In the same way as described for the step of disengagement true and proper, for the step of selection of a gear range as well, the selection command signals SEL and the command signals GEAR1 and GEAR2 are generated in the block 160 for as long as the flag associated with this step assumes the first logic value and therefore, at predetermined times during generation of the command signals GEAR1 and GEAR2, a return is made from the block 160 to the block 150.

The command signals GEAR1 and GEAR2 generated in the block 160 during the step of selection of the gear range have identical time patterns comprising, as shown in the FIGS. 6 and 7, a first section (current step) in which there is a rapid decrease in the width of the command signals GEAR1 and GEAR2 from the $I_O$ value assumed in the preceding disengagement step to a value, indicated in the FIGS. 6 and 7 with $I_{AS}$, slightly lower than the value $I_{PREDIS}$ assumed in the pre-disengagement step, a second section in which the width of the command signals GEAR1 and GEAR2 remains substantially constant at the value $I_{AS}$, and a third section (current step) in which there is a rapid increase in width of the command signals GEAR1 and GEAR2 from the value $I_{AS}$ to the value $I_O$ again.

Accordingly, the movable member 40 of the actuator 30 accomplishing engagement and disengagement of the gears does not effect any movement and maintains the central idle position assumed in the previous step of disengagement true and proper.

The value $I_{AS}$ is such as to maintain the movable member 40 of the actuator 30 in the central idle position (gearbox in neutral) and to promote the selection of the new gear range.

As shown in the FIGS. 6 and 7, during the selection step, the position signal X has a pattern comprising a first section in which its width increases (due to the inertia of the movable member 40 of the actuator 30) from the value $X_{DIS}$ assumed in the preceding step of disengagement true and proper to a value, indicated in the figures with $X_{SEL}$, corresponding to the central idle position of the movable member 40 of the actuator 30, and a second section in which its width remains substantially constant at the value $X_{SEL}$.

When the flag associated with the selection step changes logic value (following a modification made by the supervisor, from the first logic value to a second logic value, 1 in the present example), a jump is made from the block 150 to the block 170, in which verification takes place of whether the flag associated with the synchronization step assumes a first logic value (for instance 0).

If the flag associated with the synchronization step assumes the first logic value (YES exit of the block 170), then a block 180 is reached, whereas if the flag associated with the synchronization step does not assume the first logic value (NO exit of the block 170), a block 240 described below is reached.

In addition, as soon as the flag associated with the synchronization step assumes the first logic value, a first clock is enabled with the function of measuring the time $t_s$ elapsing from the beginning of the synchronization step.

Generated in the block 180 are suitable command signals GEAR1 and GEAR2 for the electrovalves 32, 34 so as to bring the angular velocity of the input shaft 12 of the gearbox 10 to assume an angular velocity equal to that which it will have when the new gear is inserted in order to permit the subsequent engagement of the new gear which, under normal conditions, namely in the absence of unexpected mechanical difficulties, takes place directly during the synchronization step itself.

Figure 3:
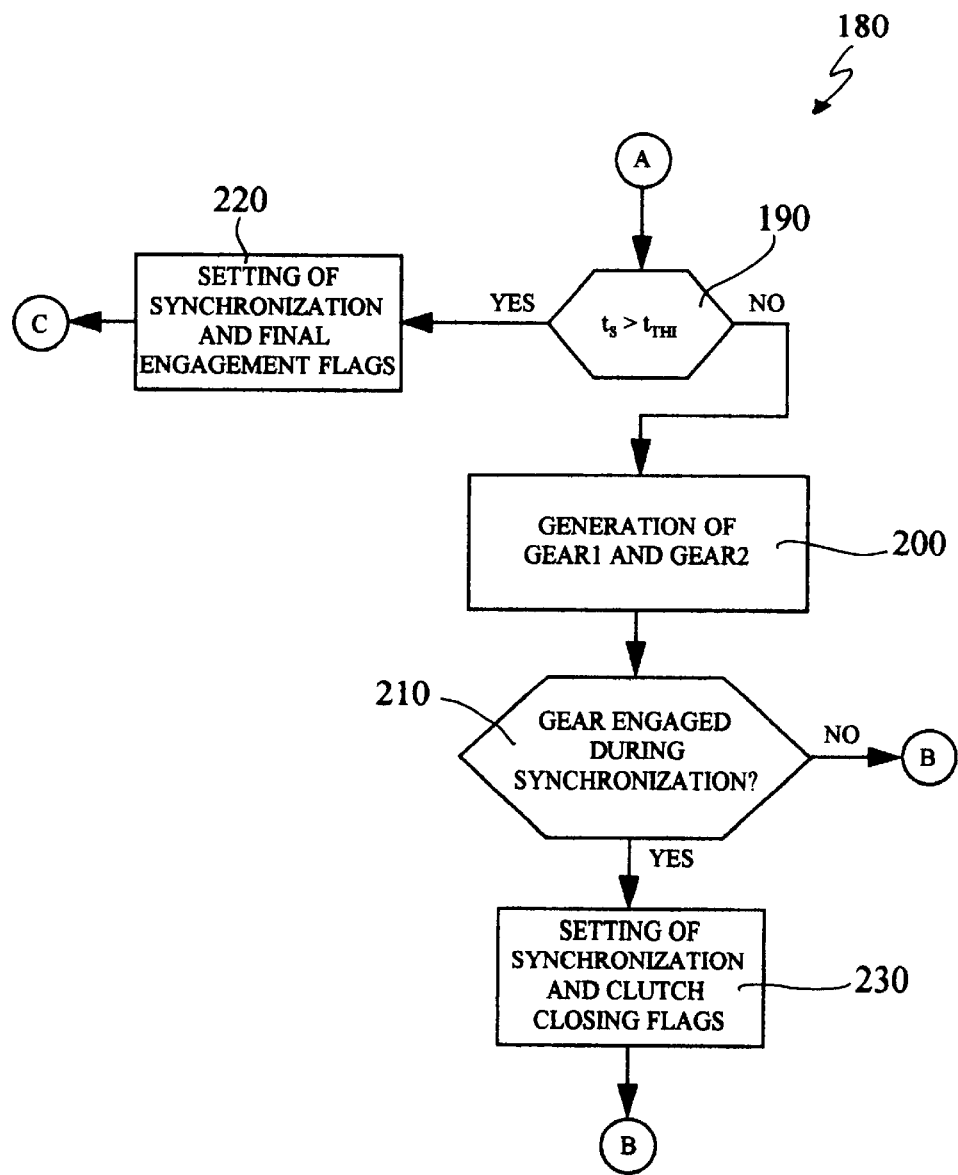

The command signals GEAR1 and GEAR2 are generated during the synchronization step preferably by using the sequence of steps illustrated in FIG. 3 and described below.

Initially a group is reached of three blocks, indicated with the numerals 190, 200 and 210, placed in series with each other and wherein the relative operations are executed in cycles one after the other.

More specifically, the duration of the synchronization step is evaluated in the block 190 so that this step may be considered terminated in any case when its duration becomes excessive. In some cases, during the gearbox 10 synchronization step, unexpected mechanical difficulties are known to arise preventing the engagement of the gear during the synchronization step and therefore the evaluation made in the block 190 of the temporal duration of the synchronization step has the purpose of considering this step terminated in any case should its duration exceed a predetermined limit value, so that the next step can be effected.

In detail, in the block 190, the time $t_s$ elapsing from the beginning of the synchronization step is compared with a predetermined limit value $t_{TH1}$. If the time $t_s$ is less than the predetermined limit value $t_{TH1}$ (NO exit of the block 190), then the block 200 is reached; otherwise if the time $t_s$ is greater than the predetermined limit value $t_{TH1}$ (YES exit of the block 190), then the synchronization step is considered terminated and the block 220 is reached, in which the flag associated with the synchronization step is set at a second logic value (1, in the present example) and the flag associated with the final engagement step is set at a first logic value (for instance 0) (the operations described in the block 220 are conducted by the above-mentioned supervisor).

From the block 220, a block 260 described below is reached.

In the block 200, reached if the duration of the synchronization step has not exceeded the predetermined limit value, suitable command signals GEAR1 and GEAR2 are generated for the electrovalves 32, 34 which have, as shown in the FIGS. 6 and 7, differing time patterns and, more precisely, a first of the command signals, for example GEAR1, has a width increasing in substantially linear fashion according to its own increase coefficient $\mu$ from an initial value $I_O$ assumed in the preceding gear range selection step, whereas a second of the command signals, GEAR2 in the present example, has a substantially null width.

In particular, the increase coefficient $\mu$ represents the rate of increase of the width of the first command signal GEAR1 and is indicated in the FIGS. 6 and 7 as the angular coefficient of the straight line representing this linear rise.

The increase coefficient $\mu$ is a characteristic value defining the time pattern of the first command signal GEAR1 in the synchronization step and, according to this invention, is calculated in relation to operative values representing the shift of gear to be effected during the gear change manoeuvre and to a correction value representing a respective style of driving the vehicle, described in detail below.

It should be pointed out that the choice of which of the two command signals GEAR1 and GEAR2 has the pattern with a substantially null width and which has the above-indicated pattern is dictated by which gear has to be engaged next and accordingly depends on which of the two end-of-stroke positions the movable member 40 of the actuator 30 is made assume in the final engagement step.

At predetermined times during the increase in width of the first command signal GEAR1, from the block 200, the block 210 is reached in which verification takes place, in a known way not therefore described in detail, of whether the engagement of the desired gear has occurred during the gearbox 10 synchronization step.

For example, this verification could be made by comparing the instantaneous value of the position signal X with a reference value representing the position that the movable member 40 would assume in the event of a perfectly successful final engagement.

If the desired gear was not engaged during the gearbox 10 synchronization step (NO exit of block 210), then the block 170 is reached again and, from here, the block 180 whereas, if the desired gear was engaged during the gearbox 10 synchronization step (YES exit of block 210), then a block 230 is reached in which the flag associated with the synchronization step is set at a second logic value (1, in the present example) and the flag associated with the clutch closing step is set at a first logic value (for instance 0) (the operations described in the block 230 are conducted by the above-mentioned supervisor).

From the block 230, the block 170 is reached again and, from here (NO exit), the block 240.

During the gearbox 10 synchronization step, the first command signal GEAR1 therefore has a width increasing in substantially linear fashion according to its own increase coefficient $\mu$ from an initial value $I_O$ assumed in the preceding gear range selection step to a value indicated in FIG. 6 with $I_{SINC}$, whereas the position signal X has a pattern comprising a first section in which its width increases in time in substantially parabolic fashion to a value indicated $X_{SINC}$, a second section in which its width remains substantially constant at the value $X_{SINC}$, and a third section in which its width increases in time in substantially parabolic fashion from the value $X_{SINC}$ to a value indicated with $X_{IN}$.

The pattern of the first command signal GEAR1 during the synchronization step permits displacement to be commanded of the movable member 40 of the actuator 30 to the end-of-stroke position corresponding to the engagement of the desired gear and therefore the value $X_{IN}$ defines the above-mentioned reference value in relation to which it is determined if the synchronization step has occurred successfully and also if the desired gear has been engaged.

In the block 240, verification takes place of whether the flag associated with the clutch closing step assumes the first logic value set in the block 230.

If the flag associated with the clutch closing step assumes the first logic value (YES exit of the block 240), then a block 250 is reached whereas, if the flag associated with the clutch closing step does not assume the first logic value (NO exit of the block 240), a return is made to the block 100.

In the block 250, generated in a known way and not therefore described in detail, are suitable clutch command signals OP/CL for the actuating group 20 accomplishing the opening and closing of the clutch 16 and suitable command signals GEAR1 and GEAR2 for the electrovalves 32, 34 of the actuating group 24 accomplishing the engagement and disengagement of the gears.

In particular, the command signals GEAR1 and GEAR2 generated in the block 250 during the clutch 16 closing step have, as illustrated in the FIG. 6, differing time patterns and, more precisely, the second command signal GEAR2 has a substantially null width, whereas the first command signal GEAR1 has a width with a pattern comprising a first section (current step) in which there is a rapid decrease of the width of the first command signal GEAR1 from the value $I_{SINC}$ assumed at the end of the preceding synchronization step to a value, indicated in FIG. 6 with $I_1$, slightly greater than the value $I_O$ assumed at the end of the disengagement step; a second section of predetermined duration in which the width of the first command signal GEAR1 remains substantially constant at the value $I_1$ so as to maintain the gear engaged and avoid its accidental disengagement; a third section (current step) in which there is a further rapid decrease of the width of the first command signal GEAR1 from the value $I_1$ to a substantially null value; and a fourth section in which the first command signal GEAR1 remains constant at the null value until the end of the clutch 16 closing step.

During the clutch 16 closing step, the position signal X, as shown in FIG. 6, remains constant at the value $X_{IN}$ assumed at the end of the synchronization step.

As stated above, unexpected mechanical difficulties may arise during the synchronization step preventing the engagement of the desired gear during the synchronization step itself.

In this case, the first command signal GEAR1 generated in the block 200 could therefore continue to increase according to its increase coefficient $\mu$ to values that could damage the synchronizer (not depicted) which physically effects the operation of synchronization of the gearbox 10 for that particular gear.

To avoid this, the control device 1 permits, as illustrated in FIG. 7, an increase of the width of the first command signal GEAR1 generated in the block 200 to a predetermined limit value $I_{LIM}$, after which it holds the width substantially constant at the limit value $I_{LIM}$.

Therefore, if the engagement cannot be effected during the synchronization step before the width of the first command signal GEAR1 reaches the predetermined limit value $I_{LIM}$, then the first command signal GEAR1 has, as shown in FIG. 7, a pattern comprising both a first section in which the width of the signal increases linearly according to its increase coefficient $\mu$ from the value $I_O$ to the value $I_{LIM}$, and also a second section in which the width of the first command signal GEAR1 remains substantially constant at the value $I_{LIM}$.

The value $I_{LIM}$ is a characteristic value defining, together with the increase coefficient $\mu$, the time pattern of the first command signal GEAR1 in the synchronization step and, according to this invention, is calculated in relation to operative values representing the gear shift to be effected during the gear change manoeuvre and to a correction value representing a respective style of driving the vehicle, described in greater detail in the following.

As stated above, when verification takes place in the block 190 if the time $t_s$ elapsing from the start of the synchronization step is greater than the predetermined limit value $t_{TH1}$ (YES exit of the block 190), then the synchronization step is considered terminated in any case, the flag associated with the synchronization step is set at a second logic value and the flag associated with the final engagement step is set at a first logic value (block 220), and the block 260 is then reached for execution of the gear final engagement step as the engagement did not take place during the synchronization step.

Following this final engagement step, the clutch closing step described above with reference to the blocks 240 and 250 will be effected.

In particular, in the block 260, verification takes place if the flag associated with the gear final engagement step assumes the first logic value set in the block 220.

If the flag associated with the gear final engagement step assumes the first logic value (YES exit of the block 260), then a block 270 is reached whereas, if the flag associated with the gear final engagement step does not assume the first logic value (NO exit of the block 260), then the block 240 described earlier for effecting clutch closing is reached.

Further, as soon as the flag associated with the gear final engagement step assumes the first logic value, a first clock is enabled with the function of measuring the time $t_{IF}$ elapsing from the beginning of the final engagement step.

In the block 270, suitable command signals GEAR1 and GEAR2 are generated for the electrovalves 32, 34 so as to bring the movable member 40 of the actuator 30 to the end-of-stroke position corresponding to the engagement of the desired gear.

Figure 4:
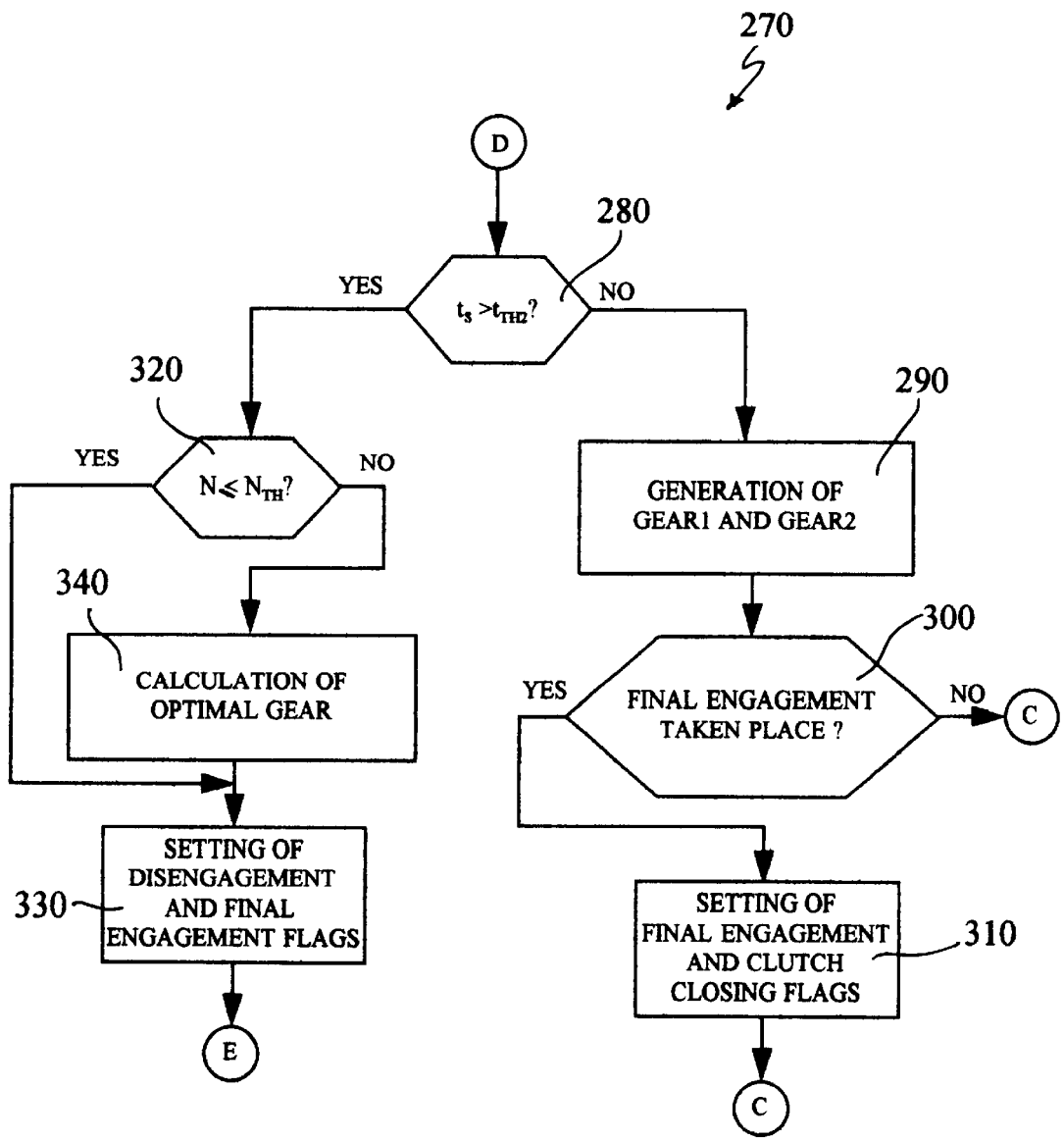

The command signals GEAR1 and GEAR2 are generated during the final engagement step preferably by using the sequence of steps illustrated in FIG. 4 and described below.

Initially a group is reached of three blocks, indicated with the numerals 280, 290 and 300, placed in series with each other and wherein the relative operations are executed in cycles one after the other.

In particular, in the block 260, in the same way as described for the synchronization step, duration is evaluated of the final engagement step so as to be able to take suitable action in the way described in detail below when the duration is excessive. In some cases, during the final engagement step, unexpected mechanical difficulties are known to arise preventing the success of the step, i.e. preventing the effective engagement of the gear. Accordingly the purpose of the evaluation made in the block 280 of the time duration of the final engagement step is that of considering the step failed should its duration exceed a predetermined limit value and of taking suitable action.

In detail, in the block 280, the time $t_{IF}$ elapsing from the beginning of the final engagement step is compared with a predetermined limit value $t_{TH2}$. If the time $t_{IF}$ is less than the predetermined limit value $t_{TH2}$ (NO exit of the block 280), then the block 290 is reached, otherwise if the time $t_{IF}$ is greater than the predetermined limit value $t_{TH2}$ (YES exit of the block 280), then it is assumed that the final engagement step has failed and a block 320 described in detail below is reached.

In the block 290, which is reached if the duration of the final engagement step is not in excess of the predetermined limit value, suitable command signals GEAR1 and GEAR2 are generated for the electrovalves 32, 34 which have, as shown in FIG. 7, differing time patterns and, more precisely, the second command signal GEAR2 has a substantially null width, whereas the first command signal GEAR1 has a time pattern comprising a first section (current step of width indicated with dI) in which there is a rapid increase of its width from the value $I_{LIM}$ assumed in the preceding synchronization step to a value indicated in the figure with $I_{IN}$, and a second section in which its width remains substantially constant at the preceding value $I_{IN}$.

It will be obvious that, when the value of the increase coefficient $\mu$ in the preceding synchronization step is such that, after a time greater than or equal to the predetermined limit value $t_{TH1}$ has elapsed, the command signal GEAR1 has still not reached the value $I_{LIM}$, then the current step dI of the subsequent final engagement step starts from the value assumed by the command signal GEAR1 at the end of the synchronization step.

The value $I_{IN}$ assumed by the first command signal GEAR1 is therefore equal to $I_{LIM}+dI$ and dI is a characteristic value defining the time pattern of the first command signal GEAR1 in the final engagement step and, according to this invention, is calculated in relation to operative values representing the gear shift to be effected during the gear change manoeuvre and to a correction value representing a respective style of driving the vehicle, described in detail below.

The rapid increase of the width of the first command signal GEAR1 from the value $I_{LIM}$ to the value $I_{IN}$ and its being held constant at the value $I_{IN}$ should permit, in the event of success of the final engagement step, the final displacement of the movable member 40 of the actuator 30 from the position it had assumed at the end of the synchronization step to the second end-of-stroke position corresponding to the engagement of the desired gear. For this reason, therefore, as illustrated in FIG. 7, the position signal X should have, on account of the rapid increase of the width of the first command signal GEAR1, a pattern increasing in time to an engagement value $X_{IN}$ corresponding to the second end-of-stroke position of the movable member 40.

If, however, mechanical difficulties arise during the final engagement of the gear preventing the success of the step, the position signal X would not have an pattern increasing in time to an engagement value $X_{IN}$ but a substantially constant pattern at the value $X_{SINC}$ assumed in the preceding synchronization step (as shown in FIG. 7 with a horizontal dash line).

Therefore, to verify if the final engagement step has actuation difficulties or not, at predetermined times while the width of the first command signal GEAR1 is being held constant at the value $I_{IN}$, from the block 290, the block 300 is reached, in which verification takes place in a known way and not therefore described in detail, if the final engagement step has been successful. For example, this verification may be effected by comparing the instantaneous values of the position signal X with a reference value representing the position that the movable member 40 would assume in the event of a perfectly successful final engagement.

If the final engagement step has not been successful (NO exit of the block 300), then the block 260 is reached again and from here the block 270, otherwise if the final engagement step has been successful (YES exit of the block 300), then a block 310 is reached in which the flag associated with the final engagement step is set at a second logic value (1, in the present example) and the flag associated with the clutch closing step is set at the first logic value.

From the block 310, a return is made to the block 260 and from here (NO exit) to the block 240 described above in relation to the execution of the clutch closing step.

As stated above, when in the block 280 it is verified if the time $t_{IF}$ elapsing from the beginning of the final engagement step is greater than the predetermined limit value $t_{TH2}$ (YES exit of the block 280), then it is assumed that the final engagement step was unsuccessful, i.e. that the required gear was not engaged, and therefore the block 320 is reached.

According to a first aspect of the present invention, the following operations are effected on verification of the failure of the final engagement step: firstly the engagement of the gear requested by the driver is attempted a predefined number of times N and, if these attempts are unsuccessful, an optimal gear different from the one that it has been attempted to engage up to now is defined and engaged, in order not to prejudice the vehicle's operating safety.

To do this, verification takes place in the block 320 if the number of times N that engagement of the desired gear has been attempted (that is to say, if the steps of disengagement true and proper, selection, synchronization and final engagement have been repeated N times) is less than or equal to a predetermined threshold value $N_{TH}$.

If N is less than or equal to $N_{TH}$ (YES exit of the block 320), then a block 330 is reached in which the flag associated with the disengagement step true and proper is set at the first logic value and the flag associated with the final engagement step is set at a second logic value (1, in the present example).

From the block 330, a return is made to the block 130 for repetition of the steps of disengagement true and proper, of selection, of synchronization, of final engagement in the event of problems in the synchronization step, and of clutch closing where the synchronization step or final engagement step have been successful.

The need to repeat all the steps of disengagement true and proper, of selection, of synchronization and, if and as necessary, of final engagement is due to the fact that a failed attempt to insert the required gear is probably caused by a jamming of the gearbox 10 and therefore, by repeating only the final engagement step, there is a risk of not eliminating the jamming; on the other hand, the repetition of the steps of disengagement true and proper, of selection, of synchronization and, if and as necessary, of final engagement is intended precisely to eliminate the jamming of the gearbox 10 so as to permit the engagement of the requested gear.

Conversely, if N is greater than $N_{TH}$ (NO exit of the block 320), a block 340 is reached in which an optimal gear to be engaged, different from the one that it has been attempted to insert up till now, is defined in a known way and not therefore described in detail. For example, the optimal gear may be calculated in a known way on the basis of the speed of the vehicle, the angular velocity of the engine 4, the position of the accelerator pedal 60, of the brake pedal 62, etc.

From the block 340, the block 330 is reached in which the flag associated with the disengagement step true and proper is set at the first logic value and the flag associated with the final engagement step is set at a second logic value.

From the block 330, a return is made to the block 130 for repetition of the steps of disengagement true and proper, of selection, of synchronization, of final engagement in the event of problems in the synchronization step, and of clutch closing where the synchronization step or final engagement step have been successful, in order to engage the optimal gear calculated in the block 340.

Accordingly, in this way, with the present control device 1, it is possible to intervene under particular operating conditions of the gearbox, such as failures or jamming that do not otherwise permit engagement of the requested gear, with consequent risk for the driver.

As previously mentioned, according to a second aspect of the present invention, the values of the widths of the command signals GEAR1 and GEAR2 during the step of disengagement, of synchronization and of final engagement of the gear are determined by the control device 1 in relation to the gear shift to be effected, that is to say if a change is made from the first to the second gear or from the fourth to the third, etc., and to the vehicle driving style estimated by the control device 1 on the basis of the operative signals G present at its input.

To sum up, the values calculated by the control device 1 in the blocks 140, 200 and 290 are:

the values $I_{DIS1}$ and $I_{DIS2}$ of the widths of the command signals GEAR1 and GEAR2 reached at the end of the increasing pattern (step) section of the widths of the command signals GEAR1 and GEAR2 in the disengagement step;

the value $I_O$ of the widths of the command signals GEAR1 and GEAR2 reached at the end of the decreasing pattern section of the widths of the command signals GEAR1 and GEAR2 in the disengagement step;

the increase coefficient $\mu$ of the width of the first command signal GEAR1 in the synchronization step;

the value $I_{LIM}$ of the width of the first command signal GEAR1 in the synchronization step; and the value dI of the width of the step of the first command signal GEAR1 during the final engagement step.

Figure 5:
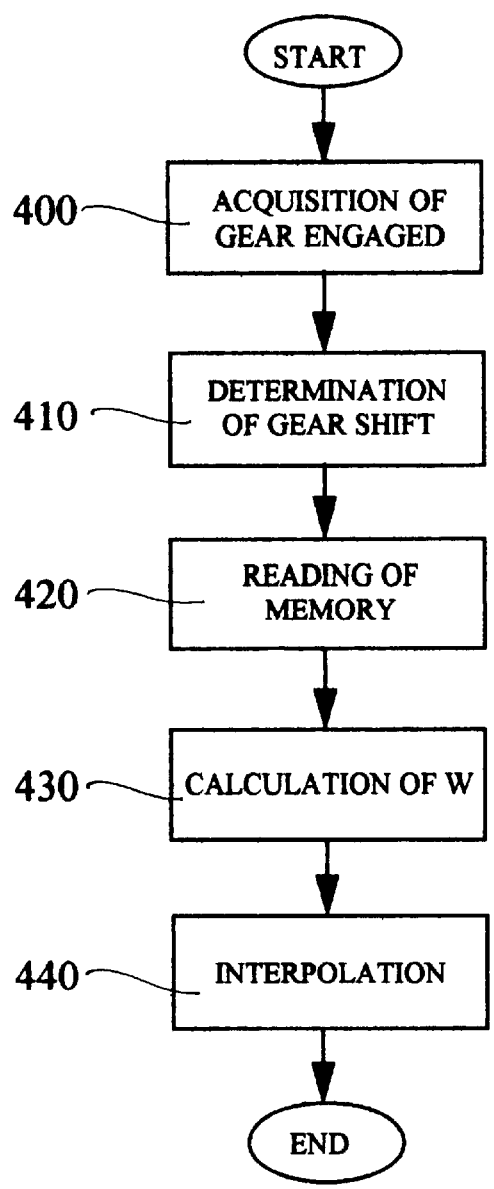

The values $I_{DIS1}$ and $I_{DIS2}$, $I_O$, $\mu$, $I_{LIM}$ and dI are determined in the way described below with reference to the flow chart of FIG. 5.

Upon the gear change request made by the driver of the vehicle through the selector device 58, a block 400 is reached in which the gear that the driver has requested to insert is acquired.

From the block 400, a block 410 is reached in which, as the gear currently engaged is known, the gear shift to be effected is determined.

From the block 410, a block 420 is reached in which, on the basis of the gear shift to be effected determined in the block 410, a plurality of pairs of operative reference values, corresponding to this gear shift and each associated with a respective characteristic value, is read in the memory 72. In particular, each pair comprises a minimum operative value and a maximum operative value of reference defining a range for the respective characteristic value.

In detail, the following pairs of operative values are read in the memory 72: $(I_{DIS1,MIN}, I_{DIS1,MAX})$, $(I_{DIS2,MIN}, I_{DIS2,MAX})$, $(I_{O,MIN}, I_{O,MAX})$, $(\mu_{MIN}, \mu_{MAX})$, $(I_{LIM,MIN}, I_{LIM,MAX})$ and $(dI_{MIN}, dI_{MAX})$.

The above minimum and maximum values are obtained from experimental tests performed by the gearbox 10 manufacturer and take into account maximum permissible loads on the parts of the gearbox; in particular, the minimum values are such as to improve, if applied, the running comfort whereas the maximum values are such as to improve, if applied, the vehicle's performance.

From the block 420, a block 430 is reached in which an operative correction value W ranging from 0 to 100% is determined in relation to the operative signals G present at the input of the control device 1, enabling calculation in the way described below of the characteristic values $I_{DIS1}$, $I_{DIS2}$, $I_O$, $\mu$, $I_{LIM}$ and dI in relation to their minimum and maximum operative reference values, read in the memory 72.

In particular, an operative correction value W equal to 0% is a value permitting a considerable improvement of running comfort to the detriment of the vehicle's performance, whereas an operative correction value W equal to 100% is a value permitting a considerable improvement of the vehicle's performance to the detriment of the running comfort.

The operative correction value W is determined in the block 430 on the basis of one or more of the following operative variables:

$p_1$: position of the accelerator pedal 60 (indicative of the power required of the engine 4);

$p_2$: pressure exerted by the driver on the brake pedal 62 (indicative if the driver is braking or not and what the pressure exerted is);

$p_3$: performance level of the vehicle (normal or sporty) selected by the driver through the selection push-button 66;

$p_4$: angular velocity of the engine 4 (indicative of the instantaneous operating condition of the engine 4); and $p_5$: temperature of the oil in the gearbox 10 (when cold, for example, it may be beneficial to apply greater forces to the gearbox to engage a gear).

In detail, where the operative correction value W is determined in relation to one of the above-mentioned operative variables $p_1$, $p_2$, $p_3$, $p_4$, $p_5$, a respective single-variable correction function $W=F_1(p_1, p_2, p_3, p_4, p_5)$ is stored in the memory 72, defining a bi-univocal correspondence between each value assumed by the operative variable and a corresponding operative correction value W, whereas where the operative correction value W is determined in relation to two or more of the above-mentioned operative variables $p_1$, $p_2$, $p_3$, $p_4$, $p_5$, a respective multi-variable correction function $W=F_2(p_1, p_2, p_3, p_4, p_5)$ is stored in the memory 72, defining a bi-univocal correspondence between each combination of the values assumed by the operative variables and a corresponding operative correction value W.

Moreover, the law according to which each operative correction value W is associated with a particular value or a particular combination of values assumed by the above-mentioned operative values is obtained empirically on the basis of experimental tests conducted in the laboratory or on the road.

The operative correction value W is therefore used for determining the characteristic values $I_{DIS1}$, $I_{DIS2}$, $I_O$, $\mu$, $I_{LIM}$ and dI in order to obtain an optimum compromise between running comfort and the vehicle's performance.

In particular, for determining the characteristic values $I_{DIS1}$, $I_{DIS2}$, $I_O$, $\mu$, $I_{LIM}$ and dI, from the block 430, a block 440 is reached in which a linear interpolation is effected, for each of the characteristic values, between each pair of respective minimum and maximum operative values of reference in relation to the operative correction value W.

For example, the increase coefficient $\mu$ may be calculated using the following known formula:

$$\mu(W) = \mu_{MIN} + \frac{\mu_{MAX} - \mu_{MIN}}{100} \cdot W(\%)$$

Similar formulas may be used for calculating the other characteristic values.

It will be obvious that interpolation methods other than those described with reference to the block 440 may be used for determining the above-mentioned characteristic values.

Accordingly, in the generation of the command signals GEAR1 and GEAR2 for the engagement and disengagement of the gears, account may be taken of vehicle operative factors that have a considerable influence on the running comfort and safety, such as the different types of gearbox that may be commanded by the actuator to which the gear engagement/disengagement command signals are fed, the driver's style of driving, and the gear operative situation, i.e. the gear shift to be effected.

According to a variant of the present invention, the double-effect actuator 30 with three defined mechanical positions accomplishing the engagement and disengagement of the gears may be substituted by a double-effect type actuator with two defined mechanical positions (not illustrated).

Operation of the double-effect actuator 30 with two defined mechanical positions is known and will not therefore be described in detail. It is however pointed out that the operation of this type of actuator differs from that of the actuator with three defined mechanical positions in that the displacement of the movable member 40 from the first to the second end-of-stroke position is commanded by one only of the electrovalves 32 and 34 by feeding oil into one only of the two chambers 42, 44 and in that, in order to dispose the movable member 40 in the central idle position, oil under pressure is not fed into the chambers 42, 44 of the actuator 30 but the flow of oil under pressure to the chamber to which oil is currently being fed must instead be interrupted.

According to this second embodiment, therefore, as illustrated in FIG. 8, during the engagement of a gear, the first command signal GEAR1 GEAR2 has a pattern substantially identical to that illustrated in FIG. 6 whereas the second command signal GEAR2 has a null width for the entire duration of the gear change manoeuvre.

Finally it will be clear that changes and variants may be made to the control device 1 and method described and illustrated above without exiting from the protective scope of this invention.

For example, for each characteristic value, instead of reading a pair of reference operative values in the memory 72, a single operative reference value could be read and the characteristic value be calculated on the basis of this single operative reference value and of the correction value W.

Furthermore, the operations described in the blocks 400–440, instead of being effected for simultaneously calculating all the characteristic values, could be executed for calculating one characteristic value only at a time and then repeated for each characteristic value. The correction value W would still be unique for all the characteristic values and would accordingly be calculated once only.

What is claimed is:

1. Method for controlling a transmission group of a vehicle, said transmission group (2) comprising a gearbox (10) and actuating means (24) coupled with the gearbox (10) for commanding the engagement/disengagement of the gears;

said method comprising the step of generating at least one command signal (GEAR1, GEAR2) for said actuating means (24) during a gear change manoeuvre; said command signal (GEAR1, GEAR2) having a width with a time pattern defined by a plurality of characteristic values ($I_{DIS1}, I_{DIS2}, I_O, \mu, I_{LIM}, dI$) ;

said method being characterized in that it comprises the step of:

a) calculating at least a first of said characteristic values ($I_{DIS1}, I_{DIS2}, I_O, \mu, I_{LIM}, dI$) in relation to at least one operative reference value ($I_{DIS1,MIN}, I_{DIS1,MAX}, I_{DIS2,MIN}, I_{DIS2,MAX}, I_{O,MIN}, I_{O,MAX}, \mu_{MIN}, \mu_{MAX}, I_{LIM,MIN}, I_{LIM,MAX}, dI_{MIN}, dI_{MAX}$) representing a respective gear shift to be effected during said gear change manoeuvre and in relation to an operative correction value (W) representing a respective style of driving the vehicle.

2. Method according to claim 1, characterized in that said step of calculating said first characteristic value comprises the steps of:

b) determining the gear shift to be effected during said gear change manoeuvre;

c) determining a pair of operative reference values in relation to said gear shift, said pair of operative reference values comprising a minimum operative value and a maximum operative value of reference defining a range for said first characteristic value;

d) determining an operative correction value (W); and e) determining said first characteristic value in relation to said minimum and maximum operative reference values and to said operative correction value (W).

3. Method according to claim 2, characterized in that said step of determining an operative correction value (W) comprises the step of:

f) determining said operative correction value (W) in relation to at least one operative variable ($p_1, p_2, p_3, p_4, p_5$) detected on said vehicle and a respective correction function ($F_1$) defining a bi-univocal correspondence between each value assumed by said operative variable ($p_1, p_2, p_3, p_4, p_5$) and a corresponding operative correction value (W).

4. Method according to claim 2, characterized in that said step of determining an operative correction value (W) comprises the step of:

g) determining said operative correction value (W) in relation to a plurality of operative variables ($p_1, p_2, p_3, p_4, p_5$) detected on said vehicle and a respective correction function ($F_2$) defining a bi-univocal correspondence between each combination of values assumed by said operative variables ($p_1, p_2, p_3, p_4, p_5$) and a corresponding operative correction value (W).

5. Method according to claim 3, characterized in that each said operative variable ($p_1, p_2, p_3, p_4, p_5$) is selected in the group comprising a position of an accelerator pedal (60) of said vehicle, a pressure exerted on a brake pedal (62) of said vehicle, a performance level of the vehicle selectable preferably by means of a selection push-button (66), an angular velocity of an engine (4) of said vehicle and a temperature of the oil in said gearbox (10).

6. Method according to claim 2, characterized in that said step of determining said first characteristic value in relation to said minimum and maximum operative reference values and to said operative correction value (W) comprises the steps of:

h) effecting an interpolation between said minimum and maximum operative reference values in relation to said operative correction value (W).

7. Method according to claim 2, characterized in that it comprises the step of:

q) repeating said steps from a) to e) for all the said characteristic values.

8. Method according to claim 1, characterized in that the time pattern of the width of said first command signal (GEAR1 and GEAR2) comprises, during a first operative step of said gear change manoeuvre, at least a first section in which said width increases in substantially linear fashion according to its own increase coefficient ($\mu$) from an initial value ($I_O$), said increase coefficient ($\mu$) and said initial value ($I_O$) being two of said characteristic values defining said time pattern.

9. Method according to claim 8, characterized in that during said first section the time pattern of the width of said first command signal (GEAR1 and GEAR2) increases in substantially linear fashion according to said increase coefficient ($\mu$) from said initial value ($I_O$) to an intermediate value ($I_{LIM}$), said intermediate value ($I_{LIM}$) being a further of said characteristic values defining said time pattern.

10. Method according to claim 8, characterized in that the time pattern of the width of said command signal (GEAR1, GEAR2) also comprises, during a second operative step of said gear change manoeuvre subsequent to said first operative step, a second section in which said width increases by a predetermined amount (dI) from said intermediate value ($I_{LIM}$), said predetermined amount (dI) being a further of said characteristic values defining said time pattern.

11. Method according to claim 8, characterized in that the time pattern of the width of said command signal (GEAR1, GEAR2) also comprises, during a third operative step of said gear change manoeuvre preceding said first operative step, a third section in which said width increases from a first value ($I_{PREDIS}$) to a second value ($I_{DIS1}, I_{DIS2}$), said second value ($I_{DIS1}$, $I_{DIS2}$) being a further of said characteristic values defining said time pattern.

12. Method according to claim 1, characterized in that said first operative step comprises a step of synchronization of said gearbox (10).

13. Method according to claim 10, characterized in that said second operative step comprises a gear final engagement step.

14. Method according to claim 11, characterized in that said third operative step comprises a gear disengagement step.

15. Method according to claim 1, characterized in that said gear change manoeuvre comprises the step of effecting an operation of engagement of a requested gear and in that it also comprises the steps of:
   r) verifying if said engagement operation has been successful and said requested gear has been engaged correctly;
   s) repeating at least once said gear change manoeuvre where the engagement operation has not been successful.

16. Method according to claim 15, characterized in that said step of repeating said engagement operation comprises the steps of:
   t) repeating for a predetermined number of times said gear change manoeuvre where the engagement operation of the preceding gear change manoeuvre has not been successful; and
   u) executing a further safety step when said predetermined number of times is attained.

17. Method according to claim 16, characterized in that said safety step comprises the steps of:
   v) calculating an optimal gear different from the requested gear; and
   z) performing a gear change manoeuvre for engaging said optimal gear.

18. Method according to claim 15, characterized in that said gear change manoeuvre comprises the step of performing in succession a disengagement operation, a selection operation, a synchronization operation and an engagement operation and in that said step s) comprises the step of repeating said operations of disengagement, of selection, of synchronization and of engagement.

19. Device for controlling a transmission group of a vehicle, said transmission group (2) comprising a gearbox (10) and actuating means (24) coupled with the gearbox (10) for commanding the engagement/disengagement of the gears;
   said control device (1) comprising signal generating means (140, 180, 270) generating at least one command signal (GEAR1, GEAR2) for said actuating means (24) during a gear change manoeuvre; said command signal (GEAR1, GEAR2) having a width with a time pattern defined by a plurality of characteristic values ($I_{DIS1}$, $I_{DIS2}$, $I_O$, $\mu$, $I_{LIM}$, dI);
   said control device (1) being characterized in that said signal generating means (140, 180, 270) comprise calculating means (140, 200, 290) for calculating at least a first of said characteristic values ($I_{DIS1}$, $I_{DIS2}$, $I_O$, $\mu$, $I_{LIM}$, dI) in relation to at least one operative reference value ($I_{DIS1,MIN}$, $I_{DIS1,MAX}$, $I_{DIS2,MIN}$, $I_{DIS2,MAX}$, $I_{O,MIN}$, $I_{O,MAX}$, $\mu_{MIN}$, $\mu_{MAX}$, $I_{LIM,MIN}$, $I_{LIM,MAX}$, $dI_{MIN}$, $dI_{MAX}$) representing a respective gear shift to be effected during said gear change manoeuvre and in relation to an operative correction value (W) representing a respective style of driving the vehicle.

20. Device according to claim 19, characterized in that said calculating means (140, 200, 290) comprise:
   first determining means (400, 410) for determining the gear shift to be effected during said gear change manoeuvre;
   second determining means (420) for determining a pair of operative reference values in relation to said gear shift, said pair of operative reference values comprising a minimum operative value and a maximum operative value of reference defining a range for said first characteristic value;
   third determining means (430) for determining an operative correction value (W); and
   fourth determining means (440) for determining said first characteristic value in relation to said minimum and maximum operative reference values and said operative correction value (W).

21. Device according to claim 20, characterized in that said third determining means (430) receive as input at least one operative variable ($p_1$, $p_2$, $p_3$, $p_4$, $p_5$) detected on said vehicle and comprise storing means (72) for memorizing a respective correction function ($F_1$) defining a correspondence between each value assumed by said operative variable ($p_1$, $p_2$, $p_3$, $p_4$, $p_5$) and a corresponding operative correction value (W), said third determining means (430) generating as output said operative correction value (W) in relation to said operative variable ($p_1$, $p_2$, $p_3$, $p_4$, $p_5$) and to the respective correction function ($F_1$).

22. Device according to claim 20, characterized in that said third determining means (430) receive as input a plurality of operative variables ($p_1$, $p_2$, $p_3$, $p_4$, $p_5$) detected on said vehicle and comprise storing means (72) for memorizing a respective correction function ($F_2$) defining a correspondence between each combination of values assumed by said operative variables ($p_1$, $p_2$, $p_3$, $p_4$, $p_5$) and a corresponding operative correction value (W), said third determining means (430) generating as output said operative correction value (W) in relation to said operative variables ($p_1$, $p_2$, $p_3$, $p_4$, $p_5$) and to the respective correction function ($F_2$).

23. Device according to claim 21, characterized in that each operative variable ($p_1$, $p_2$, $p_3$, $p_4$, $p_5$) is selected in the group comprising a position of an accelerator pedal (60) of said vehicle, a pressure exerted on a brake pedal (62) of said vehicle, a performance level of the vehicle selectable by means of a selection push-button (66), an angular velocity of an engine (4) of said vehicle and a temperature of the oil in said gearbox (10).

24. Device according to claim 20, characterized in that said fourth determining means (440) comprise:
   processing means (440) for effecting an interpolation between said minimum and maximum operative reference values in relation to said operative correction value (W).

25. Device according to claim 19, characterized in that the time pattern of the width of said first command signal (GEAR1 and GEAR2) comprises, during a first operative step of said gear change manoeuvre, at least a first section in which said width increases in substantially linear fashion according to its own increase coefficient ($\mu$) from an initial value ($I_O$), said increase coefficient ($\mu$) and said initial value ($I_O$) being two of said characteristic values of said time pattern.

26. Device according to claim 25, characterized in that during said first section the time pattern of the width of said first command signal (GEAR1 and GEAR2) increases in substantially linear fashion according to said increase coefficient ($\mu$) from said initial value ($I_O$) to an intermediate value ($I_{LIM}$), said intermediate value ($I_{LIM}$) being a further of said characteristic values defining said time pattern.

27. Device according to claim 25, characterized in that the time pattern of the width of said command signal (GEAR1, GEAR2) also comprises, during a second operative step subsequent to said first step, a second section in which said width increases by a predetermined amount (dI) from said intermediate value ($I_{LIM}$), said predetermined amount (dI) being a further of said characteristic values of said time pattern.

28. Device according to claim 25, characterized in that the time pattern of the width of said command signal (GEAR1, GEAR2) also comprises, during a third operative step of said gear change manoeuvre preceding said first operative step, a third section in which said width increases from a first value ($I_{PREDIS}$) to a second value ($I_{DIS1}$, $I_{DIS2}$), said second value ($I_{DIS1}$, $I_{DIS2}$) being a further of said characteristic values defining said time pattern.

29. Device according to claim 19 characterized in that said first operative step comprises a step of synchronization of said gearbox (10).

30. Device according to claim 27, characterized in that said second operative step comprises a gear final engagement step.

31. Device according to claim 28, characterized in that said third operative step comprises a gear disengagement step.

32. Device according to claim 19, characterized in that said gear change manoeuvre comprises the step of effecting an operation of engagement of a requested gear and in that it also comprises:

comparing means (280, 300) for verifying if said engagement operation has been successful and said requested gear has been engaged correctly; and looping means (320, 330) co-operating with said comparing means (280, 300) and for commanding at least once the repetition of said gear change manoeuvre where the engagement operation has not been successful.

33. Device according to claim 32, characterized in that said looping means (320, 330) comprise cyclical repeating means (320, 330) suitable for commanding the repetition of said gear change manoeuvre a predetermined number of times where the engagement operation of the gear change manoeuvre has not been successful; said looping means (320, 330) also being suitable for selecting safety means (340, 350) when said predetermined number of times is attained.

34. Device according to claim 33, characterized in that said safety means (340, 350) comprise:

calculating means (340) for calculating an optimal gear different from said requested gear; and commanding means (350) co-operating with said calculating means (340) and suitable for commanding the performance of a gear change manoeuvre for the engagement of said optimal gear.

35. Device according to claim 32, characterized in that said gear change manoeuvre comprises the step of performing in succession a disengagement operation, a selection operation, a synchronization operation and an engagement operation and in that said looping means (320, 330) are suitable for commanding the repetition of said operations of disengagement, of selection, of synchronization and of engagement.

36. Device according to claim 19, characterized in that said actuating means (24) comprise a double-effect hydraulic actuator (30) and a first and a second pressure-regulating electrovalve (32, 34) for commanding the actuator (30).

37. Device according to claim 36, characterized in that said actuator (30) is an actuator with three defined mechanical positions.

38. Device according to claim 36, characterized in that said actuator (30) is an actuator with two defined mechanical positions.

* * * * *